Sept. 15, 1970 H. H. MORSE 3,528,133
ROTATIONAL MOLD STRUCTURE HAVING SHORT ABUTTING
FLANGES WITH ENLARGED BEAD-FORMING SECTIONS
Filed Nov. 22, 196. 2 Sheets-Sheet 1
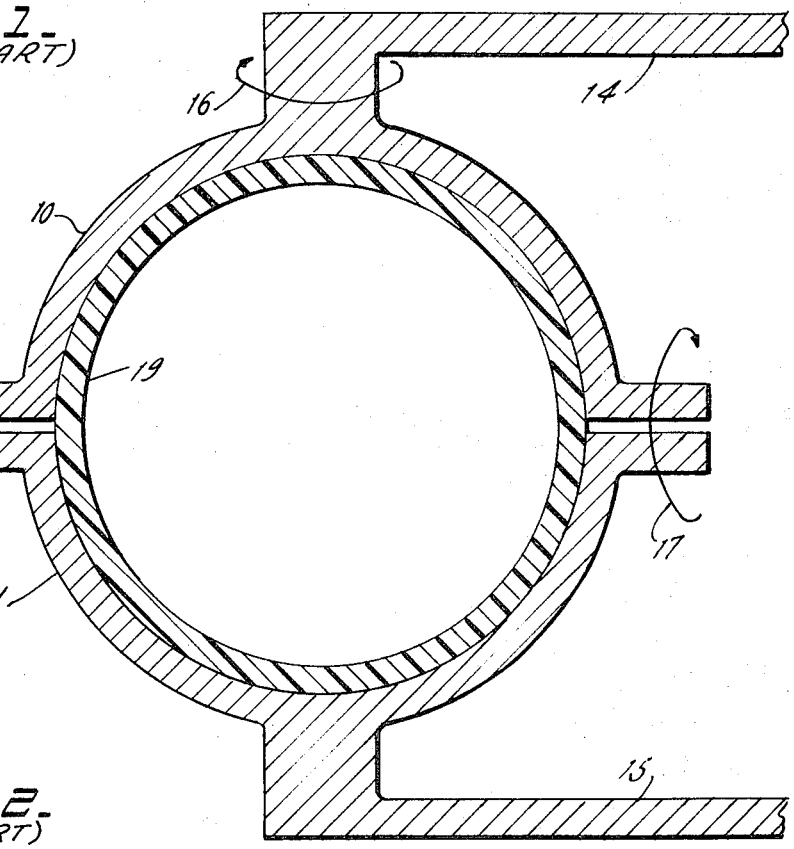
FIG. 1. (PRIOR ART)
FIG. 2. (PRIOR ART)
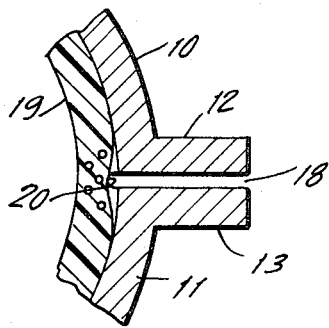
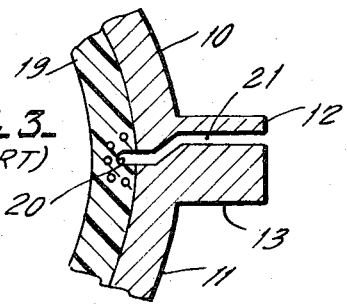
FIG. 3. (PRIOR ART)
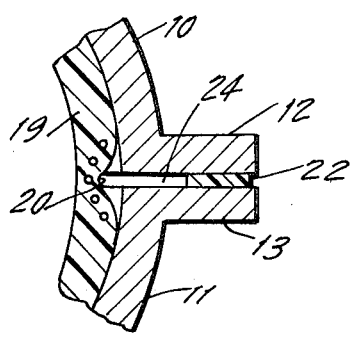
FIG. 4. (PRIOR ART)
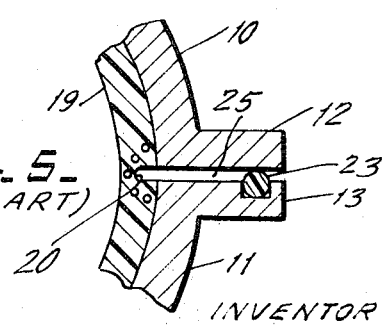
FIG. 5. (PRIOR ART)
INVENTOR
HAROLD H. MORSE
Allen A. Meyer, Jr.
ATTORNEY Sept. 15, 1970          H. H. MORSE          3,528,133
ROTATIONAL MOLD STRUCTURE HAVING SHORT ABUTTING
FLANGES WITH ENLARGED BEAD-FORMING SECTIONS
Filed Dec. 22, 1967                    2 Sheets-Sheet 2
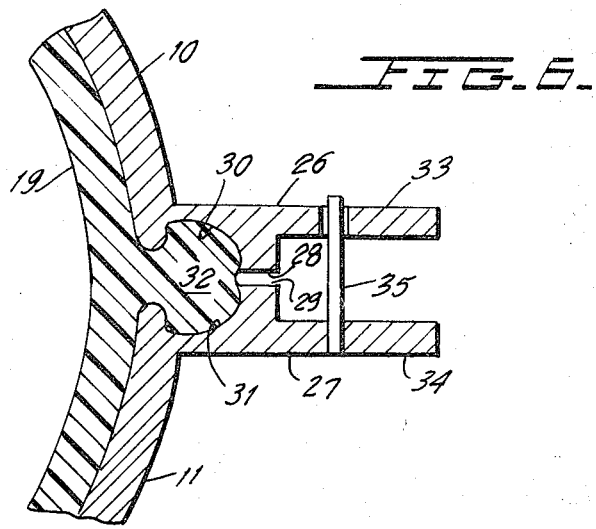
INVENTOR.
HAROLD H. MORSE
BY
Allen A. Meyer, Jr.
ATTORNEY United States Patent Office 3,528,133
Patented Sept. 15, 1970

3,528,133
ROTATIONAL MOLD STRUCTURE HAVING SHORT ABUTTING FLANGES WITH ENLARGED BEAD-FORMING SECTIONS
Harold H. Morse, Cincinnati, Ohio, assignor to National Distillers and Chemical Corporation, New York, N.Y., a corporation of Virginia
Filed Nov. 22, 1967, Ser. No. 685,108
Int. Cl. B29c 5/00
U.S. Cl. 18—26    6 Claims

ABSTRACT OF THE DISCLOSURE

A rotational mold design formed of two or more separable mold parts having short abutting flanges to permit easy escape of expanding air from between the flanges, and having bead-forming recesses to form an enlarged bead of resin around the mold parting line.

---

This invention relates to either vented or unvented mold structures for rotational molding apparatus, and more particularly relates to a novel mold design wherein the cooperating mold parts are connected over a short radial dimension and form a depression for causing an enlarged bead around the article being molded which follows the parting lines of the molds.

Rotational molding apparatus is well known where a charge of powdered resin is loaded into one part of a mold and the mold parts are closed, completely enclosing the charge. The mold is then rotated, usually simultaneously on perpendicular axes, and is heated with the resin melting and coating the mold interior. The mold is then cooled with the resin solidifying to take the shape of the mold interior.

The molds of the prior art are closed on cooperating outwardly extending flanges having flat surfaces, surfaces with a step-cut, or gasket-sealed surfaces, and the like. It has been found that such closures form air pockets against the molded article within the mold, and do not prevent air from being sucked into the mold during cooling. This air causes weakness in the molded article around the mold parting line due to entrapment of air bubbles, depressions and holes. The air also allows the molded article to leave the mold surface during cooling, thus causing warpage of the article being molded.

In accordance with the present invention, a short flange is used for the cooperating mold parts to form a minimum length air path to the exterior of the mold, with the flanges having bead-forming depressions to form a bead in the molded article around the parting line, thereby preventing weakness in the article due to air bubbles, and the like.

Accordingly, a primary object of this invention is to provide a novel mold structure for rotational molding apparatus which prevents warping of the article being molded, and prevents air bubbles or holes at the molded article parting line.

Another object of this invention is to provide a novel mold for rotational molding apparatus which prevents the entrapping of air in the molded article in the vicinity of the mold parting line.

These and other objects of this invention will become apparent from the following description when taken in connection with the drawings in which:
FIG. 1 shows a cross-sectional view of a typical prior art mold for use in rotational molding apparatus.
FIG. 2 shows the manner in which air affects the molded article of the mold of FIG. 1.
FIGS. 3, 4 and 5 are similar to FIG. 2, and show other prior art types of flange structures which are also subject to parting line weaknesses.
FIG. 6 shows a mold structure constructed in accordance with the present invention.
FIG. 7 shows a second embodiment of the invention.
FIG. 8 shows mold structure incorporating the present invention for an open-ended molded product.

FIG. 1 shows a typical prior art rotational mold structure comprised of a pair of hemispherical mold halves 10 and 11 which are provided with abutting flanges 12 and 13, respectively. Flanges 12 and 13 are intended to contact one another, but, as a practical matter, will be spaced from one another at various regions, as illustrated, due to heat distortion, and the like, after being used a few times. Flanges 12 and 13 may be bolted together or otherwise clamped. The closure means of FIG. 1 is partly shown as members 14 and 15 respectively connected to halves 10 and 11, where members 14 and 15 are suitably operated to open and close halves 10 and 11 in any suitable manner well known to the art. If desired, halves 10 and 11 could be connected to members 14 and 15 by a swivel connection.

It has been found that molds of the type shown in FIG. 1 will permit formation of air pockets between the mold halves, and will permit air to be sucked into this space between the mold and the molded product during cooling. Thus, in the mold of FIG. 1, the mold halves are opened, and a charge of powdered resin is loaded the mold. The halves are then closed, and the mold is heated above the melting temperature of the particular resin being used, with the mold rotated as shown by arrows 16 and 17 about perpendicular axes to insure tumbling of the powder over the full interior surface of the mold. When the mold temperature reaches a suitable temperature, such as 250° F. in its heating cycle, the resin starts sticking to the walls of the mold and forms a coating, bridging the two halves of the mold. This seals off the inside edge of the flanges 12 and 13, best shown in FIG. 2. As heating continues, the air in volume 18 expands. This volume 18 is frequently closed at its outer periphery due to the mold clamping forces. Even in the absence of complete sealing, the flange length is long, and typically may be 1 to 2 inches long, so the air trapped in volume 18 has a high resistance path to the exterior of the flanges. The expansion of air in this volume 18 will then deform the molded article 19, as illustrated by deformation 20 in FIG. 2, and will introduce air bubbles into this region, thereby seriously weakening the molded article in the region adjacent the mold parting line. Moreover, as the mold cools and the resin solidifies and shrinks, additional air is sucked through volume 18, permitting the article 19 to leave the mold walls at various points, thus warping the article during cooling.

FIG. 3 shows a prior art modification of the mold of FIGS. 1 and 2 where the closure for the mold halves 10 and 11 has a tortuous path 21. This path, however, is subject to all of those problems described above.

FIGS. 4 and 5 show further prior art modifications in which sealing gaskets 22 and 23, respectively, are placed between flanges 12 and 13. While this prevents the entrance of air between the flanges during cooling, they still form the initial air pockets 24 and 25, respectively, which produce the distortion 20 (which sometimes forms a hole in the article 19) and air bubbles in the article at the mold parting line.

In accordance with the invention, and as shown in FIG. 6, mold halves 10 and 11 are formed with flanges 26 and 27, respectively, which have short axially extending and abutting portions 28 and 29, respectively, on which the mold is closed. Thus, a short length passage with reduced total air volume is formed for air trapped between portions 28 and 29, with an easy escape route to the outside to prevent expansion of this air into the molded article. For example, portions 28 and 29 have radial thicknesses of about ¼ inch, sufficient to prevent leakage of powder from the mold. Flanges 26 and 27 further have bead-forming depressions 30 and 31, respectively, which communicate with portions 28 and 29, insuring the formation of a bead 32 at the mold parting line of the article 19. Bead 32 is formed to wedge the article 19 into engagement with the mold walls to prevent shrinkage of article 19 away from the mold walls, and to seal against admission of air through abutting portions 28 and 29. This thus prevents separation of the mold and the article and permits rapid and uniform cooling of the molded part to develop maximum impact strength in the molded article.

Flanges 26 and 27 are further provided with extending fin portions 33 and 34, respectively, which serve as heating and cooling fins to insure rapid thermal treatment of powdered material trapped in recesses 30 and 31, and as clamping surfaces for receiving clamping means (not shown) to hold members 28 and 29 against one another. Suitable guide pins, such as pin 35, may be used to insure proper alignment of mold parts 10 and 11. Note that the space between sections 33 and 34 is quite large, typically ½ inch or more, and they allow easy movement of air from spaces between portions 28 and 29.

FIG. 7 is similar to FIG. 6, showing the application of the invention with different proportions. Each of halves 40 and 41 have flanges 42 and 43, respectively, having bead-forming recesses 44 and 45, respectively, which form the bead 46 in molded article 47. The mold halves are closed and clamped (not shown) on extending portions 48 and 49, which engage over a small radial dimension. Guide pins 50 serve to align the mold parts.

FIG. 8 shows the application of the invention to a mold for an open-ended article 53. The mold halves comprise lower half 54 having bead-forming depression 55, an engaging portion 56, and extending clamping fin 57.

The cooperating mold cover 58 has an extending portion 59, which engages portion 56, and clamping fin 60 which receives a suitable alignment pin 61 from fin 57. An insulation liner 62 is connected to mold top 58. The arrangement of FIG. 8 causes a bead 63 to be formed which locks the open end of article 53 to the mold surface, preventing the pulling away of article 53 from the mold surface during cooling.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appending claims.

The embodiments of the invention in which an exclusive privilege or property is claimed are defined as follows:

1. A mold for rotational molding of hollow plastic articles which mold, when closed, comprises first and second separable mold sections defining a mold cavity for shaping said articles; the portions of each mold section which are adjacent to respective portions of the other mold section being spaced from said respective portions to define an opening around said mold cavity; first and second flange means joined at first and second joints, respectively, to said first and second mold sections, respectively, adjacent said opening and extending outwardly from said joints, said joints being spaced from each other by a distance greater than said opening; said first flange means including a first protrusion at a point intermediate its outer and inner edges, extending toward and abutting said second flange means to form a closure for said mold; said first flange means, including said first protrusion, and said second flange means cooperating to define a bead-forming recess around the parting line of said mold which recess communicates with said mold cavity through said opening.

2. The mold of claim 1 wherein the abutting portions of said closure define an area the width of which is less than the overall widths of said flange means.

3. The mold of claim 1 wherein said second flange means includes a second protrusion at a point intermediate its outer and inner edges extending toward said first flange means and abutting the protrusion from said first flange means to form said closure.

4. The mold of claim 1 wherein said first flange means includes a depressed channel in the surface thereof facing said second flange means, said channel positioned between said first joint and said first protrusion for defining said bead-forming recess.

5. The mold of claim 4 wherein said second flange means includes a second depressed channel therein in alignment with said depressed channel in said first flange means, and defining said bead-forming recess with said depression in said first channel.

6. The mold of claim 1 which includes means for fastening together said first and second flange means.

References Cited

UNITED STATES PATENTS

| | | | |
|---|---|---|---|
| 2,812,551 | 11/1957 | Chupa | 18—39 XR |
| 3,155,479 | 11/1964 | Zimmerman | 18—26 XR |
| 3,291,873 | 12/1966 | Eakin | 18—39 XR |
| 3,316,595 | 5/1967 | Kordiak | 18—39 |
| 2,760,775 | 8/1956 | Tipton | 18—26 XR |
| 3,173,175 | 3/1965 | Lemelson. | |

THERON E. CONDON, Primary Examiner

H. A. KILBY, JR., Assistant Examiner

U.S. Cl. X.R.

18—39